United States Patent [19]

Blackburn

[11] 3,718,017
[45] Feb. 27, 1973

[54] AUTOMATIC CONTROL SYSTEM FOR TUBE EXPANDER TOOL

[75] Inventor: Marvin J. Blackburn, Pasadena, Calif.

[73] Assignee: Vernon Tool Company, Alhambra, Calif.

[22] Filed: Aug. 23, 1971

[21] Appl. No.: 173,864

[52] U.S. Cl. .......................... 72/20, 72/28, 29/202 D
[51] Int. Cl. ............................................... B21d 9/00
[58] Field of Search .................... 72/20, 28, 393, 457; 29/157.3 R, 157.3 A, 157.3 B, 157.4, 202 D; 113/1 C

[56] References Cited

UNITED STATES PATENTS

| | | | |
|---|---|---|---|
| 2,690,205 | 9/1954 | Stary | 29/202 D |
| 2,835,308 | 5/1958 | Stary | 72/126 |
| 3,016,944 | 1/1962 | Stary | 72/123 |
| 3,628,227 | 12/1971 | Blackburn | 29/202 D |

*Primary Examiner*—Charles W. Lanham
*Assistant Examiner*—Gene P. Crosby
*Attorney*—W. D. Sellers et al.

[57] ABSTRACT

An automatic control system for a tube expander tool of the type having a hydraulically powered rotary tool which is advanced and retracted by a reversible linear motor. Operation of automatic cycling is initiated by a manual control whereas axial movement of the tool can be interrupted at any time by operating a hold control while rotation of the tool continues as long as necessary to iron out excess metal or to reposition the tube in the bore should this be desirable. The tool is maintained under constant load at all times by load sensor means in the tool advancing circuit and operable to vary the rate of tool advance to maintain a desired constant load and to prevent overloading. Accordingly, the rate of tool advance varies inversely as the load on the tool.

21 Claims, 2 Drawing Figures

PATENTED FEB 27 1973 3,718,017
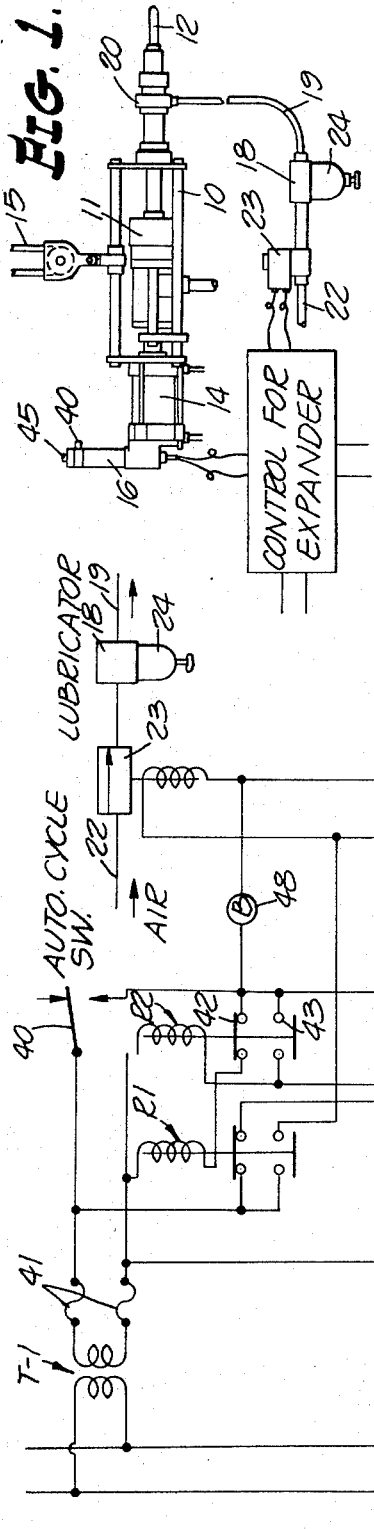
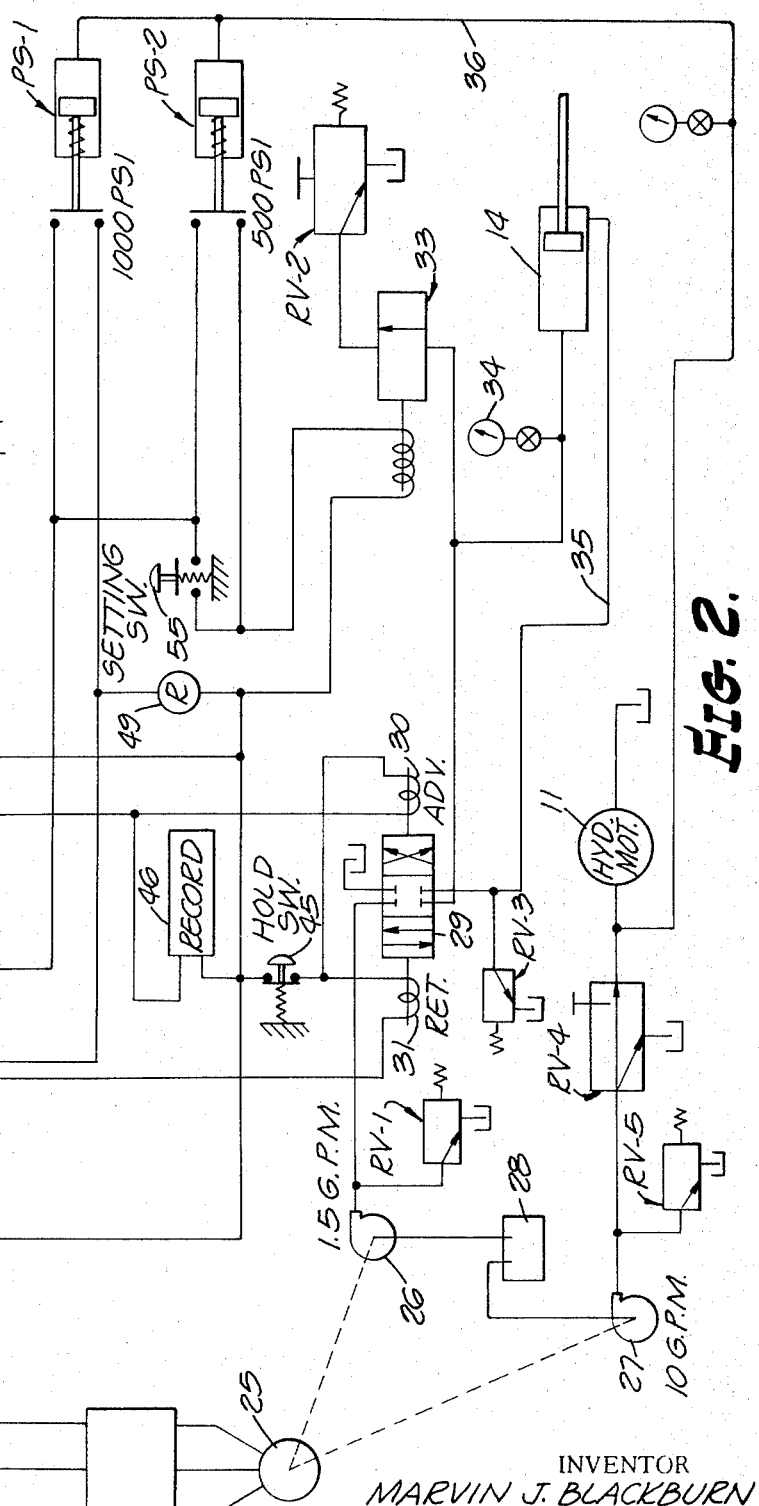

AUTOMATIC CONTROL SYSTEM FOR TUBE EXPANDER TOOL

This invention relates to tube expander apparatus and, more particularly, to an improved automatic cycling control for an expander tool capable of maintaining the tool under constant load despite widely varying operating conditions and including means for interrupting the tool advance at any time followed by automatic resumption of the auto cycle and having other innovations and advantages not heretofore available.

This invention represents certain improvements and simplification in an expander tool control over those present in the disclosure of my copending related application for United States Letters Patent Ser. No. 803,375, filed Feb. 28, 1969, now U.S. Pat. No. 3,628,227.

The control provided by the present invention is simpler in construction and operation, and more sensitive and efficient. The load sensing means for the tool is connected directly in the power circuit of the motor drive rotating the tool and can be used to initiate control of the rate of advance of the tool as well as to initiate the retraction of the tool at the end of the expanding operation. The rate of advance is controlled by a pressure relief valve in the advance fluid circuit. The load sensor may be superimposed on this circuit or, if desired, the pressure relief valve can be utilized to control the rate of advance directly. A hold control can be utilized at the election of the operator to interrupt the automatic cycling momentarily or for any desired period and, upon release, automatic cycling is resumed at the very point of interruption and continues to completion of the full operating cycle. Signal or indicator means are activated automatically as different portions of the cycle are reached thereby apprising the operator of what is taking place at all times. Another feature is the provision of automatic means for supplying lubricant to the moving parts of the tool during the working cycle and interrupting the supply at other times.

Accordingly, it is a primary object of this invention to provide a new, improved and simplified, automatic control for a tube expander tool.

Another object of the invention is the provision of an automatically cycling control system for a tube expander tool operating during the tube expanding operation to maintain a constant load on the tool and including means for interrupting the automatic cycle and for resuming the cycle at the user's option.

Another object of the invention is the provision of a control for a tube expander having load sensing means in the drive circuit operable to control the operation of the motor for advancing and retracting the tool.

Another object of the invention is the provision of a control system for a tube expander tool having an adjustable pressure relief valve in the hydraulic circuit for advancing the tool motor and operable to vary the rate of advance as necessary to avoid overloading.

Another object of the invention is the provision of an automatic control for a tube expander tool operating to vary the rate of advance inversely as the load on the tool.

Another object of the invention is the provision of a control system for a tube expander including means for automatically supplying lubricant to the operating parts of the tool during the expanding cycle and for discontinuing the supply at the end of this cycle.

These and other more specific objects will appear upon reading the following specification and claims and upon considering in connection therewith the attached drawing to which they relate.

Referring now to the drawing in which a preferred embodiment of the invention is illustrated:

FIG. 1 is a side elevational view of a tube expander tool controlled by the invention control system; and FIG. 2 is a schematic of the control system for the tool shown in FIG. 1.

Referring initially more particularly to FIG. 1, there is shown a tube expander tool of the type disclosed in detail in the aforesaid copending application. The tool has an elongated main frame 10 slidably supporting a rotary motor 11 to drive the tool proper 12 comprising rollers and a reciprocable tapered mandrel. Since these rollers and their relationship to the cage and to the tapering mandrel are well known to those skilled in this art and since these components form no part of this invention, they are not further illustrated or described. It will be understood that the mandrel for expanding the rollers against the interior of the pipe or tubing is advanced centrally between the rollers by a linear motor 14 secured to the rear end of main frame 10 and operable to advance the tapering mandrel between the rollers to expand them against the interior of the tubing. Owing to the size and weight of the tool, it is normally suspended by adjustable cabling 15 supported from a carriage on an overhead track. Positioning of the tool is further facilitated by a hand grip 16 projecting upwardly from the rear end of the tool.

The tool also includes a lubricator 18 comprising an aspirator located in an air line 19 terminating in a collar 20 the interior of which opens into the rear end of the tool and functions to discharge lubricant over the rollers and the mandrel as well as onto the adjacent area of the tubing. Lubricator 18 is activated by pressurized air entering via pipe 22 under the control of a solenoid valve 23. When this valve is open the air aspirates a small quantity of lubricant from the reservoir 24 and delivers the atomized lubricant over the rollers of the tool proper 12.

The control circuit for the tool is illustrated in detail in FIG. 2 and includes a motor 25 driving hydraulic pumps 26, 27. Pump 26 has a relatively small capacity, such as 1-½ gallons per minute, as compared to the 10 gallons per minute capacity of pump 27. Both pumps are supplied with fluids from a common reservoir 28.

Pump 26 supplies fluid to the reversible linear motor 14 by way of a self-centering normally closed four-way valve 29 having an advance solenoid 30 and a retract solenoid 31. The pressure of the fluid supplied to valve 29 is controlled by an adjustable pressure relief valve RV-1. A second pressure relief valve RV-2 is located on the downstream side of valve 29 at a point adjacent the advance end of motor 14. As shown in the schematic, the inlet to RV-2 includes a normally closed solenoid valve 33. However, it will be understood that some users prefer to omit this valve and to utilize relief valve RV-2 alone to control the pressure of the fluid admitted to motor 14 utilized to advance the mandrel expanding the rollers against the interior of the tubing. A pressure gauge 34 enables the operator to determine the setting at which relief valve RV-2 opens, namely, a setting operating to maintain a desired pressure on the rear or left hand end of motor 14. Return line 35 connects the forward end of motor 14 to the reservoir by way of the return line through valve 29. This line is preferably provided with an adjustable pressure relief valve RV-3 which is adjustable to limit the retractive force on the mandrel so the rollers must iron out the tube until such retractive force is enough to break the wedge effect between the mandrels, rollers and tube. At this time the mandrel can now retract.

The rotary tool motor 11 is fed by pump 27 through an adjustable priority valve PV-4 providing motor 11 with a predetermined volume of fluid to drive this at constant speed. The inlet pressure on this valve is controlled by an adjustable relief valve RV-5 which keeps the pressure from rising above an objectionable value. The supply line to motor 11 includes a branch line 36 extending to an adjustable high pressure sensing switch PS-1 and a lower pressure sensing switch PS-2. It will be understood that each of these switches is adjustable to close at a desired pressure. PS-1 has a rating of 1,000 psi, whereas witch PS-2 has a rating of 500 psi. Normally however, the adjustment of each of these switches is set to close the switch at a substantially lower pressure, such as 800 psi for PS-1 and 230 psi for switch PS2.

The function of PS-1 is to sense the completion of the tube expanding operation and to initiate the retraction cycle of the tool by energizing the retraction solenoid 31 of four way valve 29. The function of sensor switch PS-2 is to sense when the tube stops spinning due to its expansion into gripping contact with the bore wall by sensing an increase in the torque being developed by rotary motor 11. Immediately that spinning ceases and the pressure in conduit 36 increases to a predetermined value, PS-2 closes and activates solenoid valve 33 to its open position, thereby spilling or venting, via relief valve RV-2, a portion of the fluid flowing to the tool advancing motor 14. Motor 14 continues to advance the tool but at a rate determined by the metal build up in front of the tool rollers. When this load reaches a value determined by the setting of relief valve RV-2, the advance rate automatically varies as necessary to maintain a substantially constant load on motor 14 thereby safe-guarding the tool and all other involved structure against jamming, overloading and damage.

Referring now to the upper left hand corner of FIG. 2, there is shown an automatic cycling switch 40 which, when closed, initiates an automatic control cycle of operation. Power is supplied to this switch from the main lines via a transformer T1 and protective fuses 41. Also in circuit with the power supply and with switch 40 are a pair of relays R1,R2. As shown these relays are in their normal deactivated condition.

Relay R1 is a heavy duty relay controlling the power supply to the two solenoids 30,31 employed to operate four way valve 59. The normally closed upper contacts 42 of R2 provide an arming circuit for the coil of relay R1, whereas the lower contacts 43 of R2 provide a holding circuit for R2.

It will be understood that the auto cycling switch 40 is of the push-push type and its control button is shown in FIG. 1 as located along the side of hand grip 16 opposite the operator's index finger. The control circuit also includes a normally closed spring biased "hold" switch 45 having its operating button at the top of hand grip 16. This switch is connected in circuit with one side of the power supply and one side of each of the solenoids 30,31. Accordingly, if the "hold" switch 45 is opened while either one of these solenoids is energized, the energized solenoid will be de-energized and, in consequence, the self-centering four way valve 29 will return to its closed neutral position thereby effectively locking linear motor 14 against movement in either direction.

Additional auxiliaries include a recorder 46 of a well known type providing a graphical record of each operating cycle of the expander tool. Other auxiliaries include a blue pilot light 48 which is energized at the beginning of a tube expanding cycle and a red pilot lamp 49 which is energized at the end of the advance portion of the tube expanding cycle and remains on during the retraction cycle and until the operator opens switch 40.

OPERATION

To initiate an operating cycle, the operator inserts the forward end 12 of the tool into the inlet end of a tube held in known manner centered in a bore of a header or other device against which it is to be rigidly expanded to provide a fluid-tight high pressure mechanical joint. An expanding operation is then initiated simply by depressing the auto cycle push-push switch 40 to its closed position.

It will be understood that motor 25 driving pumps 26,27 has been previously activated and that pressurized fluid is then being supplied to the tool rotating motor 11 as well as to the four way valve 29 now in its closed neutral position. As switch 40 is closed power is supplied to the lubricator solenoid valve 23 to the blue pilot lamp 48 to activate both of these components. Accordingly valve 23 opens allowing pressurized air to aspirate lubricant from reservoir 24 and deliver the same over the rollers of the expander tool. At the same time recorder 46 is activated to record the expanding operation and power is supplied via the normally closed contacts 42 of relay R2 to the coil of relay R1. The lower contacts of this relay then close to supply power to the advance solenoid 30 of valve 29. Pressurized fluid is now supplied to the left end of linear motor 14 to shift the mandrel of the tool forward thereby expanding the rollers further and further as they rotate to expand the tube.

Initially and before the load builds up on the tubing, the advance of the tool will be relatively rapid. However, as the pressure on the rollers increases so does the torque on the rotary motor 11 with the result that pressure sensing switch PS2 will close as soon as the sensed pressure reaches the value for which the switch has been preset. When this occurs power will be supplied via the auto cycling switch 40 and the contacts of PS2 to energize solenoid valve 33, closing the latter to permit excess fluid to vent from the supply line to the rear end of motor 14 back to the reservoir via pressure relief valve RV-2. If solenoid valve 33 is omitted from the circuit, then pressure relief valve RV-2 may be adjusted and utilized to control the pressure at which fluid is vented from motor 14, thereby to control the rate of advance without need for PS-2. Accordingly, it will be understood that during the advance cycle, the system operates automatically to advance the tool at a variable rate depending upon the operating conditions and the load on motor 14 sensed by RV-2.

On occasion, the operator will sense that an abnormal condition exists and that the tool is being overloaded despite the presence of the overload control provided by PS-2. Or, alternatively, the operator may wish to interrupt the advance cycle for some reason. For example, he may wish to use the control system and the tool to reposition the tube in the bore before actual pressure contact of the tube with the bore wall. This is done by allowing the tool to operate as described above until the rollers have firmly engaged the interior of the tube but before the tube has been expanded into contact with the bore wall. Having observed that this condition exists, the operator can depress "hold" switch 45 and then manipulate the tool as necessary to shift the tube either forward or rearwardly along the bore. During this time the tool continues to rotate against the interior wall of the tube but without expanding the tube. As soon as the tubing has been manually shifted to a proper position using the expander tool to manipulate the tube, the operator releases switch 45 allowing it to close whereupon the advance solenoid 30 is again energized to resume the supply of fluid to the outer end of motor 14. At other time, the operator may merely wish to interrupt the operating cycle temporarily for some reason. In this event he merely holds switch 45 in open position to deactivate whichever solenoid 30,31 is then energized. This allows valve 29 to move immediately to its neutral position blocking the flow from both ends of motor 14 and locking the tool against movement. Immediately that switch 45 is permitted to close the operating cycle resumes from exactly the same position at which the cycle was interrupted.

When the tool reaches the end of its expanding operation it will be impossible to further expand the tube because of its fully expanded position against the bore wall. This will cause the pressure in the supply line to motor 11 to increase sharply and close sensor switch PS-1. The closing of this switch energizes red pilot lamp 49, energizes relay R2 thereby supplying power to the retraction solenoid 31. Only momentary energization is required to close the relay after which the relay is maintained energized by the closing of its lower contacts 43 thereby maintaining this relay energized until the operator opens the automatic cycling switch 40. The energization of R2 opens its upper contacts 42 breaking the power supply to the lubricator solenoid and relay R1. The latter relay then resumes its open position in which its upper contacts are closed to energize the retraction solenoid 31 of valve 29.

Pressurized fluid is now supplied via valve 29 to the right hand end of motor 14 causing the tool to retract. The tool moves quickly to its fully retracted position at which time excess fluid escapes from the discharge side of pump 26 via relief valve RV-1. This condition continues until the operator again depresses switch 40 to open it.

Should the operator wish to change the setting on RV-2 controlling the rate of venting of fluid from the advance end of motor 14 he can close switch 55 to bypass switch PS2. He holds switch 55 closed while adjusting the control knob of RV-2 and observing pressure gauge 34 to note the operating pressure on the cylinder.

While the particular automatic control system for tube expander tool herein shown and disclosed in detail is fully capable of attaining the objects and providing the advantages hereinbefore stated, it is to be understood that it is merely illustrative of the presently preferred embodiment of the invention and that no limitations are intended to the detail of construction shown other than as defined in the appended claims. is in

I claim:

1. A control system for a tube expander tool of the type having separate hydraulically driven means for rotating and for linearly advancing and retracting the tool axially of the tube end being expanded against a bore wall, said control system comprising: means to initiate an automatic tube expansion cycle of operation while said tool is rotating, and means to advance said tool while maintaining the load on said tool substantially constant throughout the portion of the advance cycle wherein the tube is undergoing forced expansion against a bore wall.

2. A control system as defined in claim 1 characterized in the provision of control means of interrupting the tool advance portion of the cycle at any time and for resuming the advance cycle at the option of the user.

3. A control system as defined in claim 2 characterized in that said control means includes means responsive to the actuation thereof to interrupt the advance cycle to thereupon lock the tool against movement in either axial direction during the period of advance cycle interruption.

4. A control system as defined in claim 1 characterized in the provision of manually adjustable relief valve means effective to bleed pressurized fluid from the fluid used to advance said tool.

5. A control system as defined in claim 4 characterized in the provision of manually operable means to activate and deactivate said adjustable relief valve means at the user's option while the tool advance cycle is in operation.

6. A control system as defined in claim 1 characterized in the provision of means activated during the tool advance cycle to deliver a lubricating medium to portions of said expander tool in use to expand a tube.

7. A control system as defined in claim 6 characterized in the provision of means for deactivating said lubricant delivery means at the end of the tube expanding cycle to avoid the use of additional lubricant while the tool is not in actual use to expand tubing.

8. A control system as defined in claim 1 characterized in the provision of means for preventing the release of pressurized fluid from said hydraulically driven means for advancing said expander tool until the pressure supplied to the tool rotating means has reached a predetermined value.

9. A control system as defined in claim 1 characterized in the provision of cycle stop control means operable to interrupt the axial movement of said expander at any point in its complete operating cycle without interfering with the ability of said control system to resume and complete the entire operating cycle upon the restoration of said stop control to its normal position.

10. A control system as defined in claim 1 characterized in the provision of independently operable pump means each effective to supply pressurized fluid to a respective one of said means for rotating and for reciprocating said tube expander tool.

11. A control system as defined in claim 1 characterized in the provision of first indicator means operable to provide a visual indication whenever said control system is operating, and second indicator means operable to provide a separate and distinct signal at the end of the tube expanding portion of the operating cycle and remaining energized until said control system is deactivated.

12. A control system as defined in claim 1 characterized in that said means controlling the fluid pressure to advance said expander tube tool is effective to vary the rate of advance inversely as the load on said tool.

13. A control system as defined in claim 1 characterized in the provision of means for sensing the increasing torque load on the tool rotating means during the first portion of a tool advancing cycle, and means responsive to a predetermined fluid pressure at the inlet to the tool rotating means to control the rate of advance of said tool within the tube being expanded.

14. A control system as defined in claim 1 characterized in that said means for maintaining said load substantially constant during the advance portion of the cycle is effective to control the advance of said tool.

15. A control system as defined in claim 1 characterized in the provision of means therein responsive to a predetermined increase in the pressure of fluid supplied to rotate said tool to initiate the retraction of said tool toward its starting position.

16. A control system as defined in claim 15 characterized in the provision of means for maintaining said retraction cycle in operation until the tool is fully retracted.

17. A control system as defined in claim 16 characterized in the provision of means for automatically discharging pressurized fluid back to a reservoir therefor at the conclusion of a complete tube expanding cycle.

18. An automatic control for a tube expander of the type having motor means for rotating the tool and reversible linear motor means for advancing and retracting the tool, said system comprising an operating cycle initiating means, means operatively connected with said initiating means and with the power supply to each of said motors responsive to the operation of said initiating means to advance said tool at a rate determined by the load imposed on said tool, and means for automatically reversing said linear motor means when the tube has been expanded against a bore wall to a predetermined load value thereby to retract said tool from the tubing.

19. A control as defined in claim 18 characterized in that said motor means are hydraulically powered under the control of fluid control valve means including self-centering solenoid-operated four way valve means for controlling the operation of said reversible linear motor means, and adjustable relief valve means for maintaining the fluid pressure supplied to said linear motor means substantially constant during the tool advance portion of the tube expanding cycle.

20. A control as defined in claim 19 characterized in that said cycle initiating means including pressure sensing means responsive to a predetermined pressure in the supply line to said rotary motor to activate said pressure relief valve means and thereupon regulate the rate of advance of said tool.

21. A control as defined in claim 18 characterized in that said means connected in circuit with said cycle initiating means includes first and second relay means, said first relay means being operable in one position thereof to energize an advance control solenoid in said flow control valve means and being operable in the other position thereof to energize a retract control solenoid of said flow control valve means.

* * * * *